United States Patent
Matsushima

(10) Patent No.: US 11,440,250 B2
(45) Date of Patent: Sep. 13, 2022

(54) THREE-DIMENSIONAL SHAPING METHOD

(71) Applicant: MIMAKI ENGINEERING CO., LTD., Nagano (JP)

(72) Inventor: Takuya Matsushima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 765 days.

(21) Appl. No.: 16/261,567

(22) Filed: Jan. 30, 2019

(65) Prior Publication Data

US 2019/0255769 A1   Aug. 22, 2019

(30) Foreign Application Priority Data

Feb. 16, 2018 (JP) .............................. JP2018-025674

(51) Int. Cl.
*B29C 64/205* (2017.01)
*B33Y 10/00* (2015.01)
(Continued)

(52) U.S. Cl.
CPC .......... *B29C 64/205* (2017.08); *B29C 64/112* (2017.08); *B29C 64/227* (2017.08);
(Continued)

(58) Field of Classification Search
CPC ... B29C 64/205; B29C 64/112; B29C 64/227; B29C 64/393; B29C 64/40; B33Y 10/00; B33Y 30/00; B33Y 50/02
(Continued)

(56) References Cited

U.S. PATENT DOCUMENTS

2016/0107382 A1*  4/2016  Wada ..................... B33Y 10/00
                                                                    428/523
2016/0198576 A1   7/2016  Lewis et al.
(Continued)

FOREIGN PATENT DOCUMENTS

| EP | 3117983    | 1/2017 |
|----|------------|--------|
| JP | 2016037040 | 3/2016 |
| JP | 2017109324 | 6/2017 |

OTHER PUBLICATIONS

Office Action of Japan Counterpart Application, with English translation thereof, dated Aug. 24, 2021, pp. 1-9.
(Continued)

*Primary Examiner* — Michael J Brown
(74) *Attorney, Agent, or Firm* — JCIPRNET

(57) ABSTRACT

A method for shaping a three-dimensional (3D) shaped object using a 3D shaping device including a shaping table having a substantially flat upper surface on which the 3D shaped object is shaped; an ejection unit that ejects ink for 3D shaping, a planar scanning driving unit that relatively moves the ejection unit with respect to the shaping table in a plane parallel to the upper surface of the shaping table; a layering scanning driving unit that relatively separates the ejection unit and the shaping table from each other in a layering scanning direction; and a flattening unit that flattens the ejected and layered ink; where a support layer disposed between the shaping table and the 3D shaped object to support the 3D shaped object from the lower side includes a plurality of layers formed by being layered in plurals on the shaping table before shaping the 3D shaped object.

8 Claims, 7 Drawing Sheets

(51) Int. Cl.
  *B29C 64/393*   (2017.01)
  *B33Y 30/00*    (2015.01)
  *B33Y 50/02*    (2015.01)
  *B29C 64/112*   (2017.01)
  *B29C 64/227*   (2017.01)
  *B29C 64/40*    (2017.01)

(52) U.S. Cl.
  CPC ............ *B29C 64/393* (2017.08); *B29C 64/40* (2017.08); *B33Y 10/00* (2014.12); *B33Y 30/00* (2014.12); *B33Y 50/02* (2014.12)

(58) Field of Classification Search
  USPC ........................................................ 700/117
  See application file for complete search history.

(56) References Cited

U.S. PATENT DOCUMENTS

2016/0354980 A1* 12/2016 Ho .................... G05B 19/4099
2018/0117845 A1*  5/2018 Buller ................. B29C 64/386

OTHER PUBLICATIONS

"Search Report of Europe Counterpart Application", dated Jul. 30, 2019, pp. 1-9.
"Office Action of Europe Counterpart Application", dated Apr. 2, 2020, p. 1-p. 6.

* cited by examiner

THREE-DIMENSIONAL SHAPING METHOD

CROSS REFERENCE TO RELATED APPLICATIONS

This application claims the priority benefit of Japanese Patent Application No. 2018-025674, filed on Feb. 16, 2018. The entirety of the above-mentioned patent application is hereby incorporated by reference herein and made a part of this specification.

TECHNICAL FIELD

The present disclosure relates to a three-dimensional shaping method for shaping a shaped object having a three-dimensional shape.

DESCRIPTION OF THE BACKGROUND ART

In recent years, a three-dimensional shaping device (3D printer) for shaping a shaped object having a three-dimensional shape has become widespread used. In such a three-dimensional shaping device, for example, the shaped object is shaped through the layering and shaping method by overlapping a plurality of layers of ink formed using an inkjet head.

FIG. 6 shows a configuration view explaining a configuration of a three-dimensional shaping device 101. The three-dimensional shaping device 101 includes a control unit 130 for controlling the entire shaping process, a head unit 110 having an ejection unit for ejecting droplets to become a material of a three-dimensional shaped object 112 and the like, and a shaping table 103 on which the three-dimensional shaped object 112 is layered and shaped. More specifically, the shaping table 103 is a table-like member for supporting the three-dimensional shaped object 112 being shaped, and is arranged at a position facing the head unit 110, and has the three-dimensional shaped object 112 being shaped placed on an upper surface. The shaping table 103 is scanned in a layering scanning direction by a layering scanning driving unit 135, and the relative positional relationship between the shaping table 103 and the head unit 110 in a Z direction in the figure is changed.

Furthermore, the head unit 110 is two-dimensionally scanned in an XY plane in the figure. More specifically, the head unit 110 is driven by a main scanning driving unit 120 in a Y direction in the figure, which is a main scanning direction determined in advance, and the main scanning operation is performed. A main scanning operation is, for example, an operation of ejecting droplets of ink or the like for shaping while moving in the main scanning direction relatively to the three-dimensional shaped object 112 being shaped. Furthermore, the head unit 10 is driven and scanned by a sub-scanning driving unit 125 in an X direction in the figure, which is a sub-scanning direction. The driving unit for moving the head unit 10, more specifically, the main scanning driving unit 120, the sub-scanning driving unit 125, and the layering scanning driving unit 135 are controlled by the control unit 130, respectively.

As described above, the three-dimensional shaping device includes the shaping table 103 on which droplets of ink or the like ejected from the ejection unit of the head unit 10 are layered. The shaping table 103 is, for example, an aluminum flat plate which surface is subjected to alumite-treatment, and the surface on a side where the ink is layered is desirably substantially flat so that the ink is flatly layered.

However, irregularities actually exist on the surface of the shaping table which should be substantially flat. The surface of the shaping table is a guaranteed value in which, for example, an arithmetic average roughness is about 200 microns. In the three-dimensional shaping, ink droplets such as an ultraviolet curable resin are generally layered on a shaping table, but if the height of the shaped object to be shaped is, for example, about 5 mm, the influence of irregularities on the surface of the shaping table is not significant. However, the influence becomes larger as the shaped object becomes larger.

FIG. 7A is an explanatory view explaining a surface roughness of the shaping table. The surface roughness of the shaping table has an undulation of, for example, 200 microns, specifically about ±100 microns with respect to a height of an average indicated with a chain dashed line. Here, for example, as shown in FIG. 7B, assume that a support material ink is layered on the shaping table as a foundation (see Japanese Unexamined Patent Publication No. 2016-37040). Assuming that the shaping table has the surface roughness as described above, the surface of the foundation reflects the surface roughness of the shaping table even if the foundation is formed with the support material ink. Then, when a shaped object is shaped on the foundation, there arises a problem that irregularities and undulation which should not originally be formed are shaped in a three-dimensional shaped object shaped by layering the ink and the like (see FIG. 7C).

SUMMARY

In light of the foregoing, the present disclosure provides a three-dimensional shaping method for shaping a three-dimensional shaped object according to a previously made design by compensating for a surface roughness of a shaping table.

One way of thinking is to place a flat resin plate on the shaping table and then shaping a shaped object thereon, but if the resin plate and the shaped object are strongly attached, the shaped object becomes difficult to detach from the resin plate itself. Further, in some cases, the shaped object may be damaged when being detached. Therefore, in the present disclosure, a supporting layer (foundation) having a necessary and sufficient thickness and a flat surface is formed using a support material ink so as to compensate for the surface roughness of the shaping table, and a three-dimensional shaped object is shaped on the foundation.

The present disclosure provides a three-dimensional shaping method for shaping a three-dimensional shaped object using a three-dimensional shaping device including a shaping table having a substantially flat upper surface on which the three-dimensional shaped object is shaped; an ejection unit that ejects ink for three-dimensional shaping; a planar scanning driving unit that relatively moves the ejection unit with respect to the shaping table in a plane parallel to the upper surface of the shaping table; a layering scanning driving unit that relatively separates the ejection unit and the shaping table from each other in a layering scanning direction which is a direction perpendicularly intersecting the planar direction and in which the ink is layered; and a flattening unit that flattens the ejected and layered ink; where a support layer disposed between the shaping table and the three-dimensional shaped object to support the three-dimensional shaped object from the lower side includes a plurality of layers formed by being layered in plurals on the shaping table before shaping the three-dimensional shaped object; and the plurality of layers have a lower part side in a vertical direction of the plurality of layers formed only by the planar scanning driving unit, and an upper part side in the vertical direction of the plurality of layers formed using both the planar scanning driving unit and the layering scanning driving unit.

According to the method described above with respect to the surface roughness, specifically, irregularities and undulation of the upper surface of the shaping table, a support layer having a sufficient thickness may be layered using a support material ink on the shaping table and then flattened, so that a foundation having a flat surface can be formed, and an excellent effect is obtained in that a quality of a three-dimensional shaped object to be shaped on the foundation is improved.

Furthermore, when forming the lower part side of the support layer, a layering time for eliminating the surface roughness of the shaping table can be shortened since the shaping table is not moved in the layering scanning direction. Moreover, when forming the upper part side of the support layer, the shaping table may be lowered, thereby achieving an excellent effect in that interference between a flattened portion, the ink layered and cured as the lower part side, and the ejection unit can be prevented.

According to the method described above, where the layering scanning driving unit relatively separates the ejection unit and the shaping table from each other in the layering scanning direction each time one layer of the upper part side in the vertical direction of the plurality of layers may be layered.

According to the method described above, since the ejection unit and the shaping table can be relatively separated in the layering scanning direction each time one layer of the upper part side of the support layer may be layered, the interference of the cured ink and the ejection unit can be prevented.

According to the method described above, where a shaping table gap may be increased every time the ejection unit is caused to carry out a predetermined number of planar scanning operations of ejecting the ink while relatively moving in the planar direction set in advance for the formation of the upper part side; and when a layering scanning distance which is a distance change in the layering scanning direction in the layering scanning operation of the layering scanning driving unit, and a thickness on the upper part side ejected and layered from the ejection unit when the ejection unit carries out the predetermined number of planar scanning operations with respect to each position in the support layer are compared, the layering scanning distance is smaller than the thickness on the upper part side.

According to the method described above, since the layering scanning distance which is the distance change in the layering scanning direction may be smaller than the thickness of layering the upper part side of the support layer, an excellent effect is obtained in that a flatness of the upper part of the support layer is ensured.

According to the method described above, where the flattening unit may not brought into contact with the support layer being formed while layering the lower part side, and the flattening unit is brought into contact with the support layer during scanning in the planar direction of at least a few times while controlling the upper part side.

According to the method described above, when forming the lower part side of a plurality of layers, the shaping table gap, which is the distance between the shaping table and the flattening unit, may not changed, and hence a time for scanning the shaping table in the layering scanning direction can be reduced and a time required for shaping can be reduced. Furthermore, with respect to the upper part side of the plurality of layers, since the surface can be flattened, the support layer having a flat surface can be formed. Therefore, the quality of the three-dimensional shaped object to be shaped on the support layer is improved.

According to the method described above, where before the ejection unit ejects a support material ink to form the support layer, a sum of a shaping table gap, which is a distance between the shaping table and the flattening unit, and a surface roughness of the upper surface of the shaping table may be made to be greater than or equal to twice the surface roughness.

According to the method described above, the sum of the shaping table gap, which is the distance between the shaping table and the flattening unit, and the surface roughness of the upper surface of the shaping table may be set to be greater than or equal to twice the surface roughness in advance, and thus an excellent effect is obtained in that the support layer formed using the support material ink can be layered with a sufficient thickness.

According to the method described above, where the lower part side of the plurality of layers may be thicker than the upper part side.

According to the method described above, when compensating for the surface roughness, specifically, the irregularities and undulation of the upper surface of the shaping table using the support material ink on the shaping table, a number of layering for a base can be reduced, and consequently, the layering time can be reduced by layering the lower part side of the base so as to be thicker than the upper part side.

According to the method described above, where a distance between the upper surface of the support layer and a bottom portion of a valley with a deepest surface roughness may be greater than a maximum height which is a sum of a height of a mountain with a highest surface roughness of the shaping table and a depth of a valley with the deepest surface roughness.

According to the method described above, since the thickness layered on the lower part side of the plurality of layers may be larger than the surface roughness on the upper surface of the shaping table, the quality of the three-dimensional shaped object shaped on the support layer is improved, and as the upper surface of the shaping table is reliably covered with the support layer, the three-dimensional shaped object shaped thereon can be easily detached from the shaping table.

According to the method described above, where while the layering scanning driving unit changes the shaping table gap, the control unit that controls the entire three-dimensional shaping device may control the ejection unit to form the support layer supporting the three-dimensional shaped object being shaped from the lower part side in the vertical direction and the three-dimensional shaped object in such order on the shaping table.

According to the method described above, the surface roughness, specifically, irregularities and undulation of the upper surface of the shaping table may be compensated by forming a flat foundation on the shaping table using the support material ink, and then the three-dimensional shaped object is formed thereafter, whereby the quality of the three-dimensional shaped object is improved.

According to the three-dimensional shaping method of claims 1 to 8 of the present disclosure, with respect to the surface roughness, specifically, irregularities and undulation of the upper surface of the shaping table, the support layer having a sufficient thickness is layered on the shaping table using the support material ink and then flattened, whereby a foundation having a flat surface can be formed, and the quality of the three-dimensional shaped object shaped on the foundation is improved.

DETAILED DESCRIPTION OF EMBODIMENTS

Figure 1A:
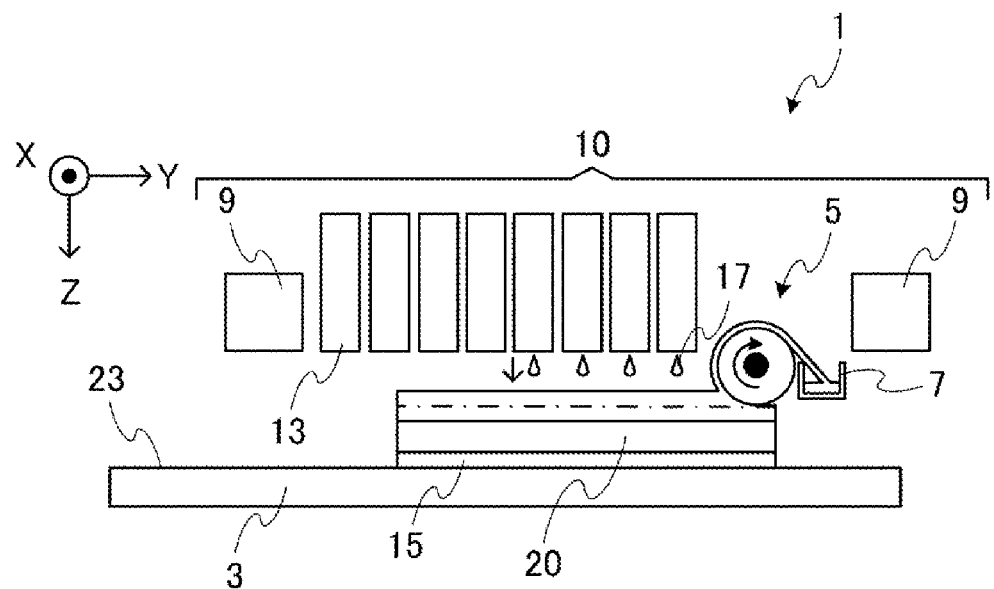
FIG. 1A is an explanatory view explaining a configuration of a three-dimensional shaping device used for a three-dimensional shaping method according to an embodiment of the present disclosure.

Hereinafter, embodiments of the present disclosure will be described with reference to the accompanying drawings.

FIGS. 1A to 5 show one example of the embodiments of the disclosure, and portions denoted with the same reference numerals in the figure indicate the same parts. In each figure, the configuration of one part is appropriately omitted to simplify the figure. The size, shape, thickness and the like of the members are represented in an appropriately exaggerated manner.

Figure 6:
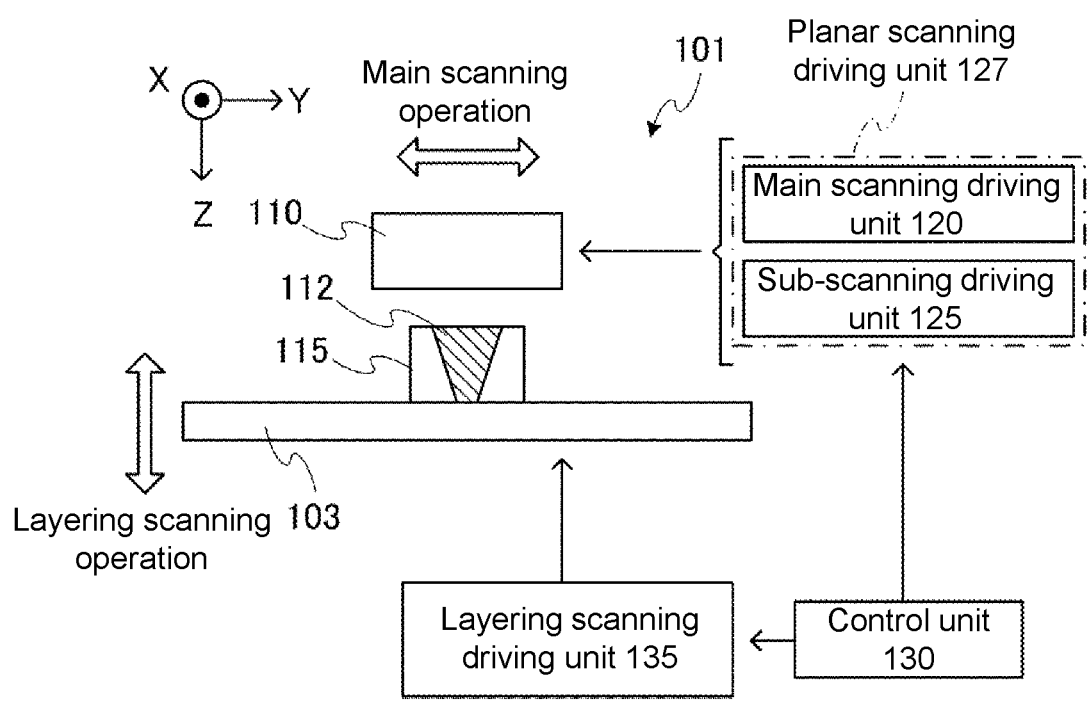
FIG. 6 is a configuration view describing a configuration of a three-dimensional shaping device.
Figure 7A:
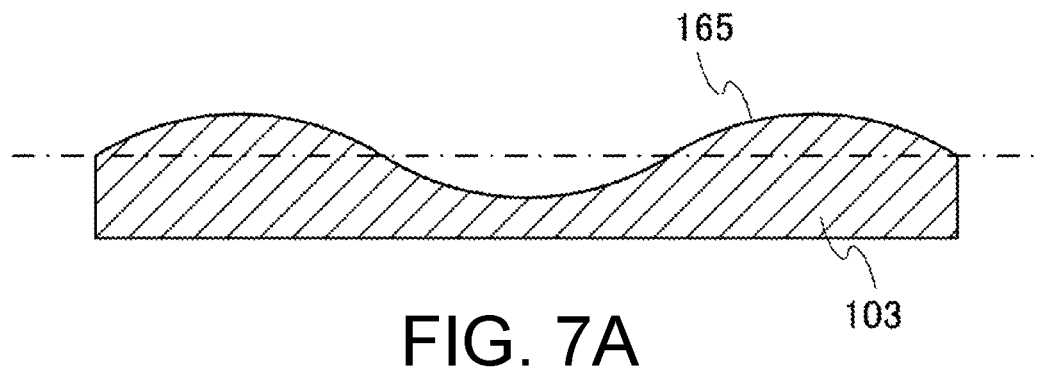
FIG. 7A is an explanatory view explaining the surface roughness of the shaping table.
Figure 7B:
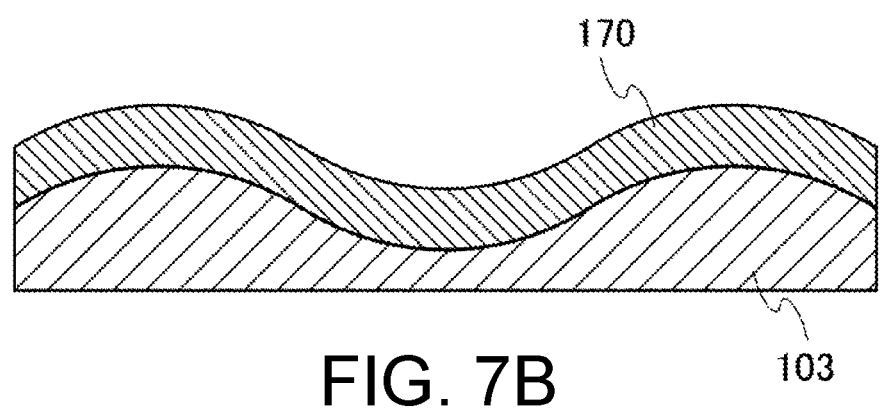
FIG. 7B is an explanatory view explaining a mode in which support material ink is layered as the foundation on the shaping table.
Figure 7C:
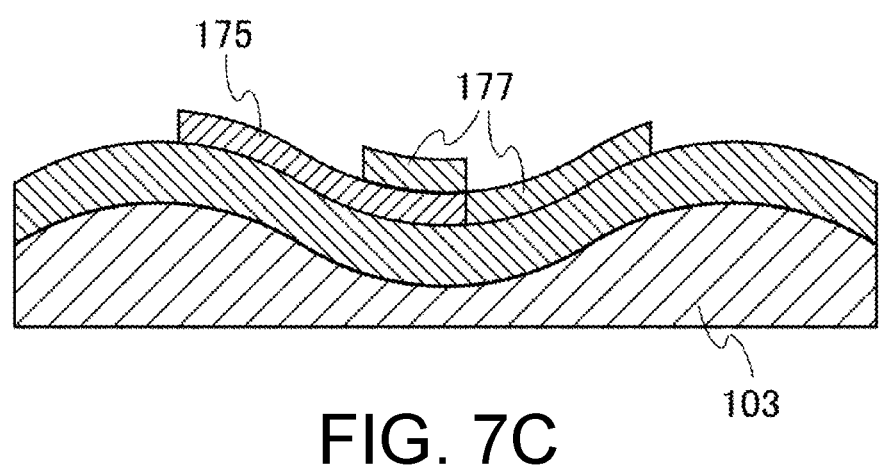
FIG. 7C is an explanatory view explaining an embodiment in which a shaped object is shaped on the foundation.

A three-dimensional shaping device 1 according to the embodiment of the present disclosure may have the same or similar configuration and features as the known three-dimensional shaping device described with reference to FIG. 6, excluding the points particularly described. Specifically, the three-dimensional shaping device 1 has the same or similar features as those of a known shaping device that performs three-dimensional shaping by ejecting droplets of ink or the like that is to become a material of a shaped object using an inkjet head. Furthermore, other than the illustrated configuration, the three-dimensional shaping device 1 may also include, for example, various types of configurations necessary for shaping, and the like of the shaped object.

FIG. 1A is an explanatory view explaining a configuration of a three-dimensional shaping device 1 used in a three-dimensional shaping method according to an embodiment of the present disclosure. The three-dimensional shaping device 1 includes a shaping table 3 having a substantially flat upper surface 23 on which a three-dimensional shaped object 20 is shaped, an ejection unit (not shown) for ejecting ink 17 for three-dimensional shaping provided in a head unit 10, a main scanning driving unit 120 (see FIG. 6) for causing the ejection unit to perform a main scanning operation of ejecting the ink 17 while relatively moving with respect to the three-dimensional shaped object 20 being shaped in a preset main scanning direction (Y direction in the figure) (see FIG. 6), a sub-scanning driving unit 125 (see FIG. 6) for relatively moving the ejection unit with respect to the three-dimensional shaped object 20 in a sub-scanning direction (X direction in the figure), a layering scanning driving unit 135 (see FIG. 6) for causing a layering scanning operation of relatively moving the shaping table 3 with respect to the ejection unit to be performed in a layering scanning direction, which is a direction in which the ink 17 is layered, a flattening unit 5 for flattening the ejected and layered ink 17, and a control unit 130 (see FIG. 6) for controlling the shaping of the three-dimensional shaped object 20.

The control unit 130 causes the ejection unit to shape a support layer (foundation) which is a structural object formed using a support material ink which is a material of a support layer 15 supporting the three-dimensional shaped object 20 being shaped and the three-dimensional shaped object 20 in this order while performing distance controlling of controlling a shaping table gap G (see FIG. 2A to be described later), which is a distance between the shaping table 3 and the flattening unit 5.

In the three-dimensional shaping method according to the embodiment of the present disclosure, the three-dimensional shaping device 1 including the shaping table 3 having a substantially flat upper surface 23 on which the three-dimensional shaped object 20 is shaped, the ejection unit (not shown) for ejecting ink for the three-dimensional shaping, a planar scanning driving unit 127 (see FIG. 6) for relatively moving the ejection unit with respect to the shaping table 3 in a plane parallel to the upper surface 23 of the shaping table, a layering scanning driving unit 135 for relatively separating the ejection unit and the shaping table in a layering scanning direction, which is a direction perpendicularly intersecting the planar direction and a direction in which the ink is layered, and the flattening unit 5 for flattening the ejected and layered ink is used.

In the present specification, the main scanning direction and the sub-scanning direction are together defined as the planar direction, and the main scanning driving unit 120 and the sub-scanning driving unit 125 are together defined as the planar scanning driving unit 127. Furthermore, an operation of ejecting ink from the ejection unit while scanning in the planar direction is defined as a planar scanning operation.

In a three-dimensional shaping method for shaping the three-dimensional shaped object 20, the support layer 15 (foundation 60, see FIG. 4D to be described later) provided between the shaping table 3 and the three-dimensional shaped object 20 to support the three-dimensional shaped object 20 from a lower side includes a plurality of layers formed by layering a plurality of layers on the shaping table 3 before shaping the three-dimensional shaped object 20, and the plurality of layers are such that a lower part side (base 40, see FIG. 4D to be described later) in the vertical direction of the plurality of layers is formed only by the planar scanning driving unit 127, and an upper part side (flattening base 57, see FIG. 4D to be described later) in a vertical direction of the plurality of layers is formed using both the planar scanning driving unit 127 and the layering scanning driving unit 135.

Next, the control of the three-dimensional shaping device 1 used in the shaping method according to the embodiment of the disclosure will be described in detail.

The control unit 130 (see FIG. 6) carries out a distance control of causing the layering scanning driving unit 135 to carry out the drive of the layering scanning operation and increasing the shaping table gap G (see FIG. 2A to be described later) every time the ejection unit is caused to carry out the main scanning operation of predetermined number of times, specifically, number of passes on the same position of the three-dimensional shaped object 20 being shaped as the distance control of while shaping the three-dimensional shaped object 20.

The control unit 130 carries out a first distance control of causing the ejection unit to perform the main scanning operation of a number of times greater than a predetermined number of times, specifically, number of passes to the same position of the base 40 being formed without changing the shaping table gap G, and a second distance control of increasing the shaping table gap G every time the ejection unit is caused to perform the main scanning operation of a predetermined number of times, specifically, number of passes to the same position of the flattening base 57 (upper part side in the vertical direction of a plurality of layers) being formed, as the distance control of forming the base (lower part side in the vertical direction of a plurality of layers) 40.

The shaping table 3 is a table-shaped member that supports the shaped object 15 being shaped, and is disposed at a position facing the inkjet head in the head unit 10, and has the three-dimensional shaped object 20 being shaped placed on the upper surface thereof. Furthermore, in the three-dimensional shaping device 1, the shaping table 3 has a configuration in which at least the upper surface is movable in the layering scanning direction, and at least the upper surface moves according to a progress of shaping of the three-dimensional shaped object 20 by being driven by the layering scanning driving unit 135 (see FIG. 6). In this case, the layering scanning direction is, for example, a direction in which the material of shaping is layered in the layering shaping method. More specifically, in the three-dimensional shaping device 1, the layering scanning direction is a direction (Z direction in the figure) orthogonal to the main scanning direction (Y direction in the figure) and the sub-scanning direction (X direction in the figure) set in advance in the three-dimensional shaping device 1.

Furthermore, at a time of the main scanning operation of the three-dimensional shaping device 1, the main scanning driving unit 120 (see FIG. 6) further drives an ultraviolet light source 9 in the head unit 10. More specifically, the main scanning driving unit 120 cures the ink that landed on a surface-to-be-shaped of the three-dimensional shaped object 20 by, for example, lighting the ultraviolet light source 9 at the time of the main scanning operation. The surface-to-be-shaped of the three-dimensional shaped object 20 is, for example, a surface where a next layer of ink is formed by the head unit 10.

The control unit includes a CPU, a RAM, a ROM, and the like, and executes various types of controls. The CPU is a so-called central processing unit, and various programs are executed to realize various functions. The RAM is used as a work area and a storage area of the CPU, and the ROM stores an operating system and programs executed by the CPU.

Figure 1B:
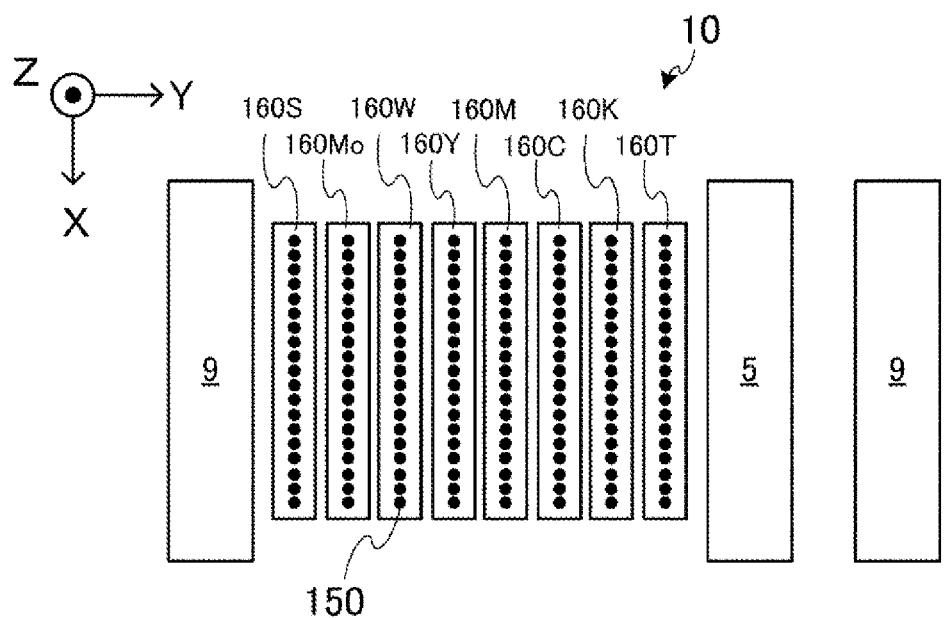
FIG. 1B is an explanatory view of a head unit of an inkjet head.

FIG. 1B is an explanatory view of the inkjet head in the head unit 10. A more specific configuration of the head unit 10 will be described. FIG. 1B shows one example of a more detailed configuration of the head unit 10. In the three-dimensional shaping device 1, the head unit 10 includes a plurality of color ink heads 160Y, 160M, 160C, 160K (hereinafter referred to as 160Y to 160K), a shaping material head 160Mo, a white ink head 160W, a clear ink head 160T, a support material head 160S, a plurality of ultraviolet light sources 9, and a flattening unit 5.

The color ink heads 160Y to 160K, the shaping material head 160Mo, the white ink head 160W, the clear ink head 160T, and the support material head 160S are inkjet heads that eject droplets by an inkjet method. In the present embodiment, the color ink heads 160Y to 160K, the shaping material head 160Mo, the white ink head 160W, the clear ink head 160T, and the support material head 160S are inkjet heads that eject droplets of ultraviolet curable ink, and are arranged side by side in the main scanning direction (Y direction) with their positions in the sub-scanning direction (X direction) aligned.

For the color ink heads 160Y to 160K, the shaping material head 160Mo, the white ink head 160W, the clear ink head 160T, and the support material head 160S, for example, known inkjet heads can be suitably used. Furthermore, each of such inkjet heads includes a nozzle row, in which a plurality of nozzles 150 are lined in the sub-scanning direction, on a surface facing the shaping table 3. In this case, the nozzle 150 of each inkjet head eject droplets in a direction toward the shaping table 3.

The arrangement of the color ink heads 160Y to 160K, the shaping material head 160Mo, the white ink head 160W, the clear ink head 160T, and the support material head 160S is not limited to the illustrated configuration, and may be variously changed. For example, some inkjet heads may be arranged so as to be shifted in position in the sub-scanning direction from other inkjet heads. Further, the head unit 10 may further include, for example, an inkjet head for colors such as light color, R (red) G (green) B (blue), orange and the like.

The color ink heads 160Y to 160K are coloring inkjet heads that eject droplets of color inks of different colors, respectively. In this embodiment, the color ink heads 160Y to 160K eject liquid droplets of ultraviolet curing ink of each color of Y (yellow), M (magenta), C (cyan), and K (black).

The shaping material head 160Mo is an inkjet head that ejects droplets of ink used for shaping the inside of a shaped object, and for example, ejects droplets of ink used for shaping a region that is not colored in the shaped object 20. In the present embodiment, the shaping material head 160Mo ejects droplets of shaping ink of a predetermined color. The shaping ink may be, for example, an ink dedicated to shaping. In the three-dimensional shaping device 1, the shaping ink is an ink having a color different from each color of CMYK. Consideration is made to using, for example, white ink, clear ink, or the like as the shaping ink.

The white ink head 160W is an inkjet head that ejects droplets of white (W) ink. The clear ink head 160T is an inkjet head that ejects droplets of clear ink. In this case, the clear ink is, for example, a colorless transparent ink.

The support material head 160S is an inkjet head that ejects droplets containing the material of the support layer 15. A water soluble material that can be dissolved in water after the shaping of the shaped object 20 can be suitably used for the material of the support layer 15. In this case, a material which curing degree by the ultraviolet light is weaker and which can be easily decomposed than the material configuring the shaped object 20 is preferably used. More specifically, a known material for the support layer can be suitably used for the material of the support layer 15.

The support layer 15 is, for example, a layered structural object formed under an overhang shape part during shaping, for example, in the case of shaping the shaped object 20 having an overhang shape. The support layer 15 is formed as necessary at a time of shaping of the shaped object 20 and removed after the completion of the shaping. In the three-dimensional shaping device 1, the support material ink forming the support layer 15 is not used only for shaping the shaped object 20 having an overhang shape, but also for forming the base 40 covering the surface roughness of the shaping table 3.

It is assumed that the shaping material ink head 160Mo is present, but the shaping material ink head 160Mo may not be provided.

The flattening unit 5 is a flattening means for flattening the layer of the ink 17 formed during the shaping of the shaped object 20 or the like. In the present embodiment, the flattening unit 5 includes at least a flattening roller 33 (see FIG. 2A to be described later) and is disposed between the arrangement of inkjet heads and the ultraviolet light source 9. Thus, the flattening unit 5 is arranged side by side in the main scanning direction (Y direction in the figure) with positions in the sub-scanning direction (X direction in the figure) aligned with respect to the arrangement of the inkjet heads. Furthermore, in this case, for example, the flattening roller 33 flattens the layer of ink by making contact with a surface of the layer of ink and removing one part of the ink before curing at the time of the main scanning operation.

In the three-dimensional shaping device 1 used in the three-dimensional shaping method according to the present embodiment, the head unit 10 includes only one flattening roller 33. In this case, the flattening unit 5 is arranged, for example, between the ultraviolet light source 9 on one end side in the head unit 10 and the arrangement of the inkjet heads. Furthermore, in this case, the main scanning driving unit 120 (see FIG. 6) at least causes the head unit 10 to carry out the main scanning operation in a direction (one direction in the main scanning direction) in which the flattening unit 5 becomes a backward side than the arrangement of the inkjets. Then, the flattening unit 5 flattens the layer of ink during the main scanning operation in this direction.

The plurality of ultraviolet light sources 9 have a configuration for curing the ink, and generate an ultraviolet light for curing the ultraviolet curable ink. For example, UVLED (ultraviolet LED) and the like can be suitably used for the ultraviolet light source 9. Furthermore, consideration is also made to use metal halide lamp, mercury lamp, and the like for the ultraviolet light source 9. In addition, in the present embodiment, each of the plurality of ultraviolet light sources 9 is arranged on one end side and the other end side in the main scanning direction in the head unit 10 so as to sandwich the arrangement of inkjet heads (color ink heads 160Y to 160K, shaping material head 160Mo, white ink head 160W, clear ink head 160T, support member head 160S) in between.

Figure 2A:
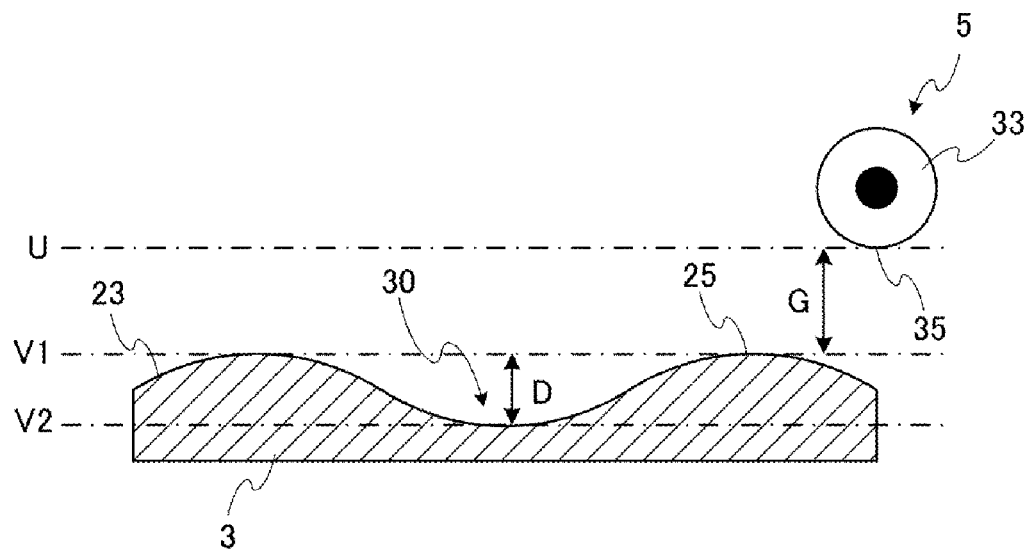
FIG. 2A is an explanatory view explaining a surface roughness on an upper surface of a shaping table and a shaping table gap, which is a distance between the shaping table and a flattening unit.

FIG. 2A is an explanatory view explaining the surface roughness on the upper surface 23 of the shaping table 3 and the shaping table gap G, which is the distance between the shaping table 3 and the flattening unit 5. In this case, the shaping table gap G is defined as a distance between, for example, a lower surface part 35 of the flattening roller and a highest point of a summit portion 25 of the undulation on the upper surface 23 of the shaping table 3.

The shaping table 3 is a flat plate in which the upper surface 23 is substantially flat, but actually has surface roughness. Specifically, for example, a difference in the Z direction, specifically a distance D (depth) between the summit portion 25 where a distance from the lower surface part 35 of the flattening roller becomes the closest and a valley portion (bottom portion) 30 where a distance from the lower surface part 35 of the flattening roller becomes the farthest corresponds to, for example, the surface roughness or 200 microns, specifically, arithmetic average roughness or ten point average roughness, or the like. Assuming a plane including the lower surface part 35 of the flattening roller and being parallel to an XY plane is a flattened surface U, a plane including the summit portion 25 of the undulation on the upper surface 23 of the shaping table 3 and being parallel to the XY plane is a summit surface V1, and a plane including the valley bottom (bottom portion of the valley portion) 30 of the undulation on the upper surface 23 of the shaping table 3 is a valley surface V2, the distance in the Z direction of the flattened surface U and the summit surface V1 is defined as the shaping table gap G. The distance in the Z direction between the summit surface V1 and the valley surface V2 corresponds to distance D.

Prior to the formation of the base 40 to be described below, specifically, before the head unit 10 (see FIG. 1B) ejects the support material ink to form the base 40, a sum of the shaping table gap G and the distance D of the surface roughness is desirably greater than or equal to twice the surface roughness of the upper surface 23 of the shaping table 3. Specifically, for example, if the surface roughness is 200 microns, the shaping table gap G is desirably 400 microns to 600 microns, specifically 500 microns.

Hereinafter, an operation of compensating for the surface roughness of the shaping table 3 to form a flat foundation 60 will be described with reference to FIGS. 2B, 3A-3C, and 4A-4D.

Figure 2B:
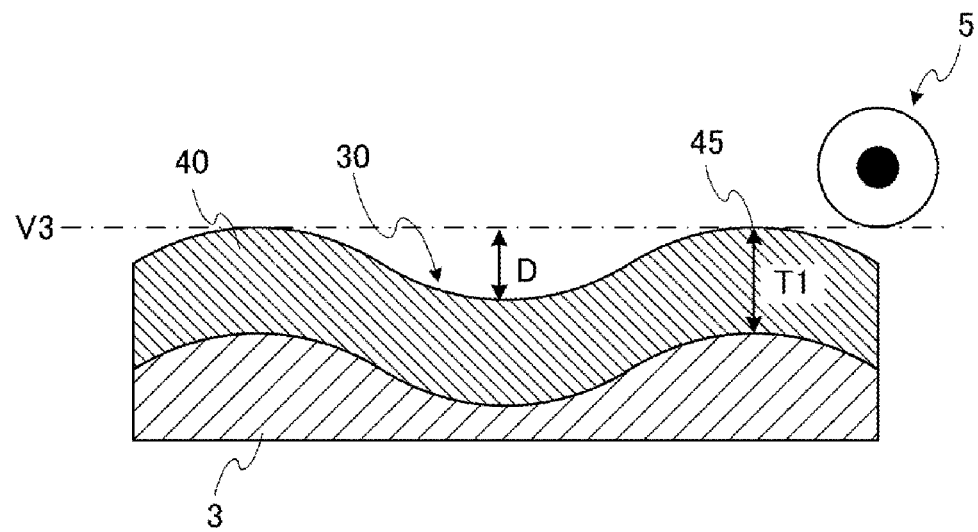
FIG. 2B is an explanatory view explaining a mode in which a lower part side of a support layer is formed on the shaping table using a support material ink without changing the shaping table gap.

FIG. 2B is an explanatory view explaining a mode in which the base 40 is formed on the shaping table 3 using the support material ink without changing the shaping table gap G. In this case, a thickness T1 of the base 40 is greater than the surface roughness of the upper surface 23 of the shaping table 3. Specifically, for example, when the surface roughness is 200 microns, the thickness T1 of the base is desirably, for example, 300 microns. The support material ink forming the base 40 having the thickness T1 is realized by carrying out layering of 5 layers to 15 layers when, for example, layering 35 microns for every main scanning operation of a predetermined number of times, specifically, number of passes. However, as shown in FIG. 2B, even if the base 40 is formed in this way, a surface roughness of the upper surface 23 of the shaping table 3 of the shaping table 3 is directly reflected on a surface of the base 40. In the base 40, a base summit surface V3 including a summit portion 45 of the base and being parallel to the XY plane and the flattened surface U including the lower surface portion 35 of the flattening roller and being parallel to the XY plane desirably substantially coincide.

Figure 3A:
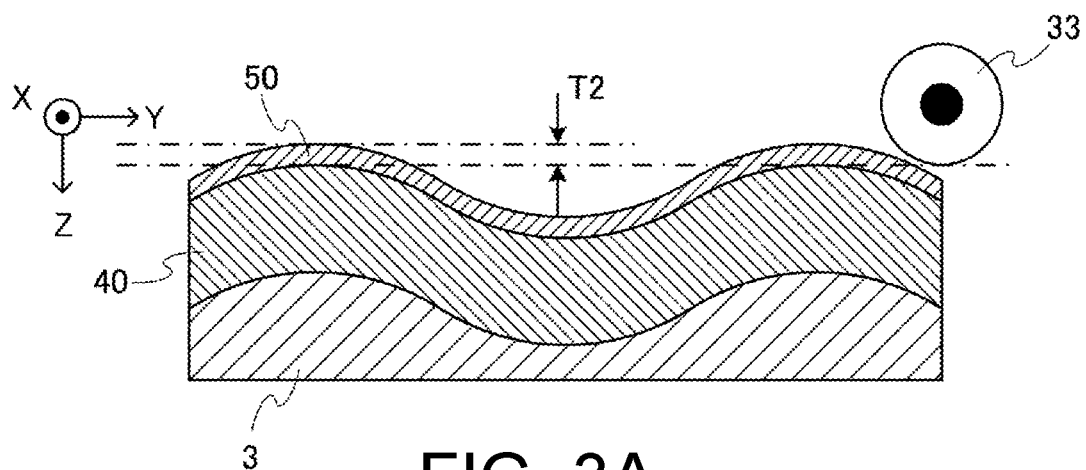
FIG. 3A is an explanatory view explaining a mode in which the head unit layers a first flattening base which is an upper part side of the support layer using the support material ink.

FIG. 3A is an explanatory view explaining a mode in which a first flattening base 50 is further layered using the support material ink by the head unit 10 (see FIG. 1B). A thickness of the first flattening base 50 is T2, and takes, for example, a value between 10 microns and 100 microns, specifically 35 microns.

Figure 3B:
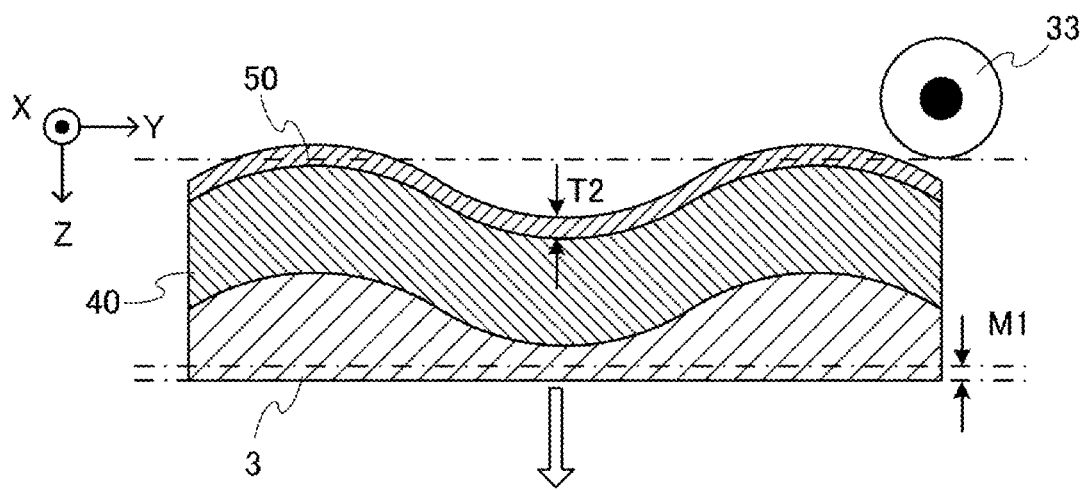
FIG. 3B is an explanatory view explaining a mode in which the shaping table is moved in a positive direction in a Z direction to increase the shaping table gap.

FIG. 3B is an explanatory view explaining a mode in which the shaping table 3 is moved in a positive direction in the Z direction in the figure to increase the shaping table gap G. At this time, the first flattening base 50 is not irradiated with ultraviolet light from the ultraviolet light source 9 (see FIG. 1A), and the first flattening base 50 is not cured. A moving distance M1 of the shaping table is, for example, 30 microns.

Figure 3C:
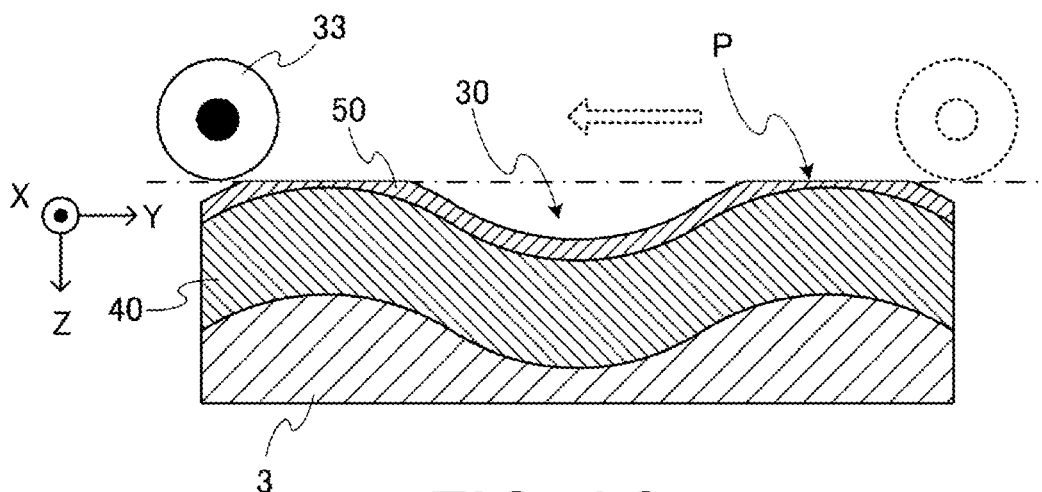
FIG. 3C is an explanatory view explaining a mode in which the first flattening base is flattened by the flattening unit.

FIG. 3C is an explanatory view explaining a mode in which the first flattening base 50 is flattened by the flattening unit 5 (see FIG. 1A). More specifically, the flattening roller 33 is moved in the main scanning direction, more specifically in a negative direction in the Y direction in the figure, thereby scraping off the ink forming the first flattening base 50. Therefore, for example, when the thickness T2 of the base is 35 microns, the first flattening base 50 is scraped off by 5 microns and a flat portion P is formed.

Summarizing the operations of FIGS. 2B, 3A, 3B, and 3C, the flattening unit 5 does not make contact with the support layer which is the base being formed during the first distance control (see FIG. 2B), and the flattening unit 5 makes contact with the support layer which is the upper part side (flattening base 57 (see FIG. 4D)) in the vertical direction of a plurality of layers being formed during the main scanning operation of at least a few times (see e.g., FIG. 3C) during the second distance control. At this time, the control unit causes the layering scanning driving unit 135 to carry out the layering scanning operation of a predetermined distance every time the main scanning operation of a predetermined number of times, specifically, number of passes is carried out with respect to each position on the upper part side in the vertical direction of a plurality of layers during the second distance control (see FIG. 3B).

Figure 4A:
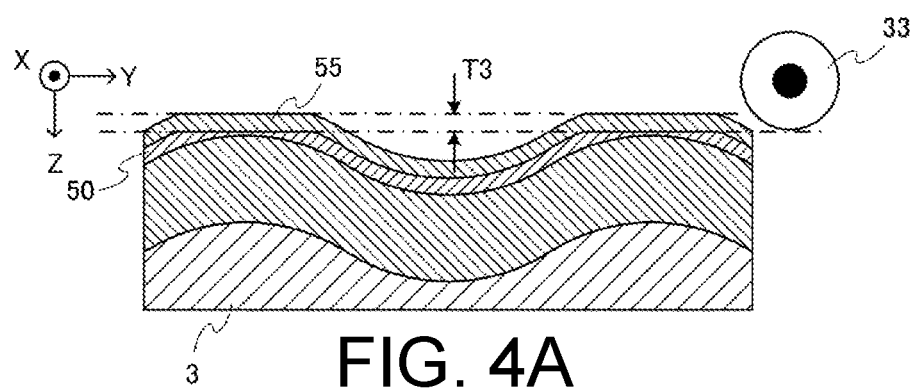
FIG. 4A is an explanatory view explaining a mode in which the head unit further layers a second flattening base as an upper part side of a support layer using the support material ink.

FIG. 4A is an explanatory view explaining a mode in which a second flattening base 55 is further layered with the head unit 10 using the support material ink. The second flattening base 55 is formed on the first flattening base 50 by further ejecting the support material ink from the head unit 10 (see FIG. 1A). At this time, for example, a thickness T3 of the second flattening base 55 is 35 microns.

Figure 4B:
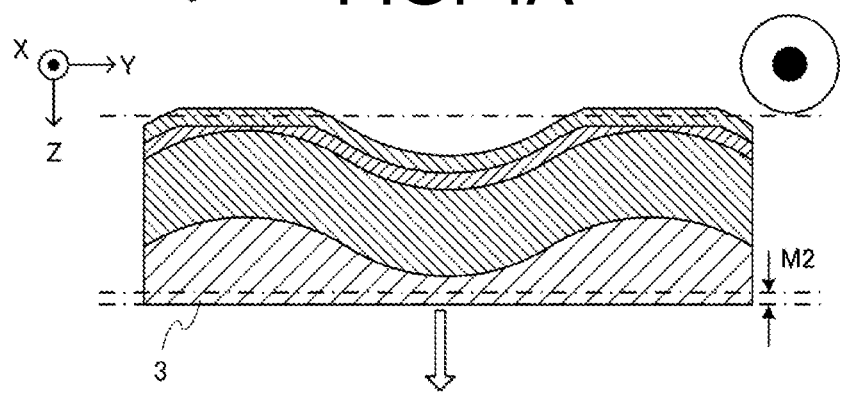
FIG. 4B is an explanatory view explaining a mode in which the shaping table is moved in a positive direction in the Z direction to increase the shaping table gap.

FIG. 4B is an explanatory view explaining a mode in which the shaping table 3 is further moved in the positive direction in the Z direction to increase the shaping table gap G. At this time, the first flattening base 50 has already been irradiated with ultraviolet light from the ultraviolet light source 9 and the curing is completed, but the second flattening base 55 is not irradiated with ultraviolet light from the ultraviolet light source 9 (see FIG. 1A), and the second flattening base 55 is not cured. A moving distance M2 of the shaping table is, for example, 30 microns.

Figure 4C:
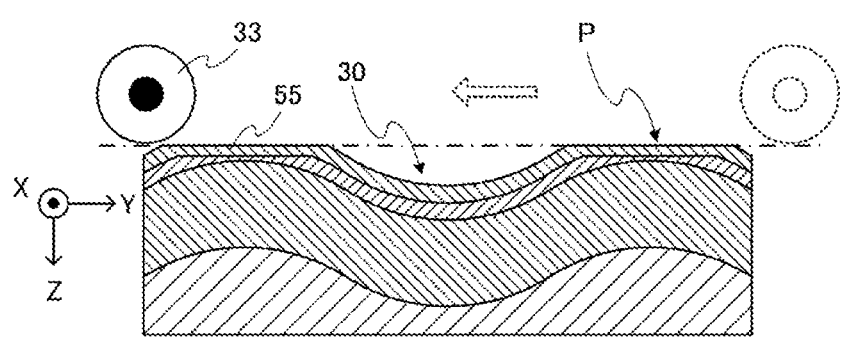
FIG. 4C is an explanatory view explaining a mode in which the second flattening base is flattened by the flattening unit.

FIG. 4C is an explanatory view explaining a mode in which the first flattening base 55 is flattened by the flattening unit 5 (see FIG. 1A). Specifically, the flattening roller 33 is moved in the main scanning direction, more specifically, in the negative direction in the Y direction in the figure, thereby scraping off the ink forming the second flattening base 55. Therefore, for example, when the thickness T3 of the base is 35 microns, the second flattening base 55 is scraped by 5 microns so that the flat portion P is formed wider than in FIG. 3C. In other words, it is synonymous with a depth of the valley portion 30 being shallower by 5 microns.

Figure 4D:
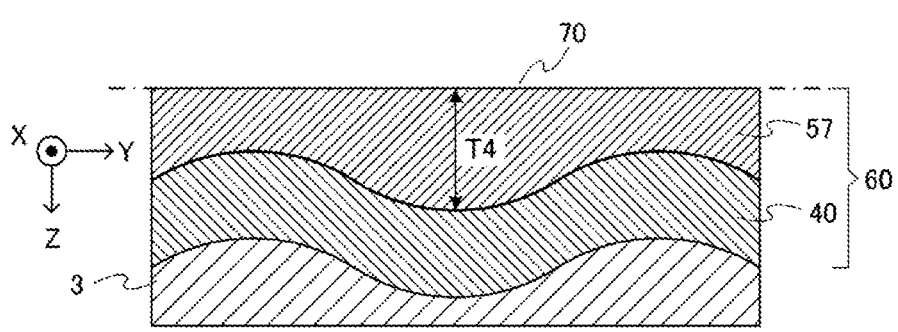
FIG. 4D is an explanatory view explaining a mode in which a valley portion is filled with the support material ink and the upper surface of a foundation on which the three-dimensional shaped object is shaped is flattened.

FIG. 4D is an explanatory view explaining a mode in which the valley portion 30 is filled with the support material ink and an upper surface of the foundation 60 on which the three-dimensional shaped object is shaped is flattened. Specifically, for example, when the valley portion 30 has the depth of D, specifically, 200 microns as shown in FIG. 2B, 40 layers to 50 layers, for example, are layered as the flattening base 57 so that the surface roughness of the shaping table 3 is compensated by the foundation 60 and a flat upper surface 70 formed by using the support material ink is obtained.

A compensation of the surface roughness described above can be represented as having the distance between the upper surface of the support layer, which is the foundation, and the bottom portion of a valley with a deepest surface roughness is greater than a maximum height, which is a sum of a height of a mountain having a highest surface roughness of the shaping table 3 and a depth of the valley with a deepest surface roughness.

According to the embodiment of the present disclosure, with respect to the surface roughness of the upper surface 23 of the shaping table, more specifically the irregularities and undulation, the support layer of sufficient thickness is layered on the shaping table 3 using the support material ink and then flattened, so that the foundation 60 having a flat surface can be formed, and an excellent effect is obtained in that the quality of the three-dimensional shaped object 20 to be shaped on the foundation 60 is improved.

Furthermore, when forming the lower part side (base) 40, a layering time for eliminating the surface roughness of the shaping table 3 can be shortened since the shaping table 3 is not moved in the layering scanning direction. Furthermore, when forming the upper part side (flattening base) 57, an excellent effect is obtained in that the interference of the flattening unit 5, the ink layered and cured as the lower part side 40, and the ejection unit can be prevented by lowering the shaping table.

Figure 5:
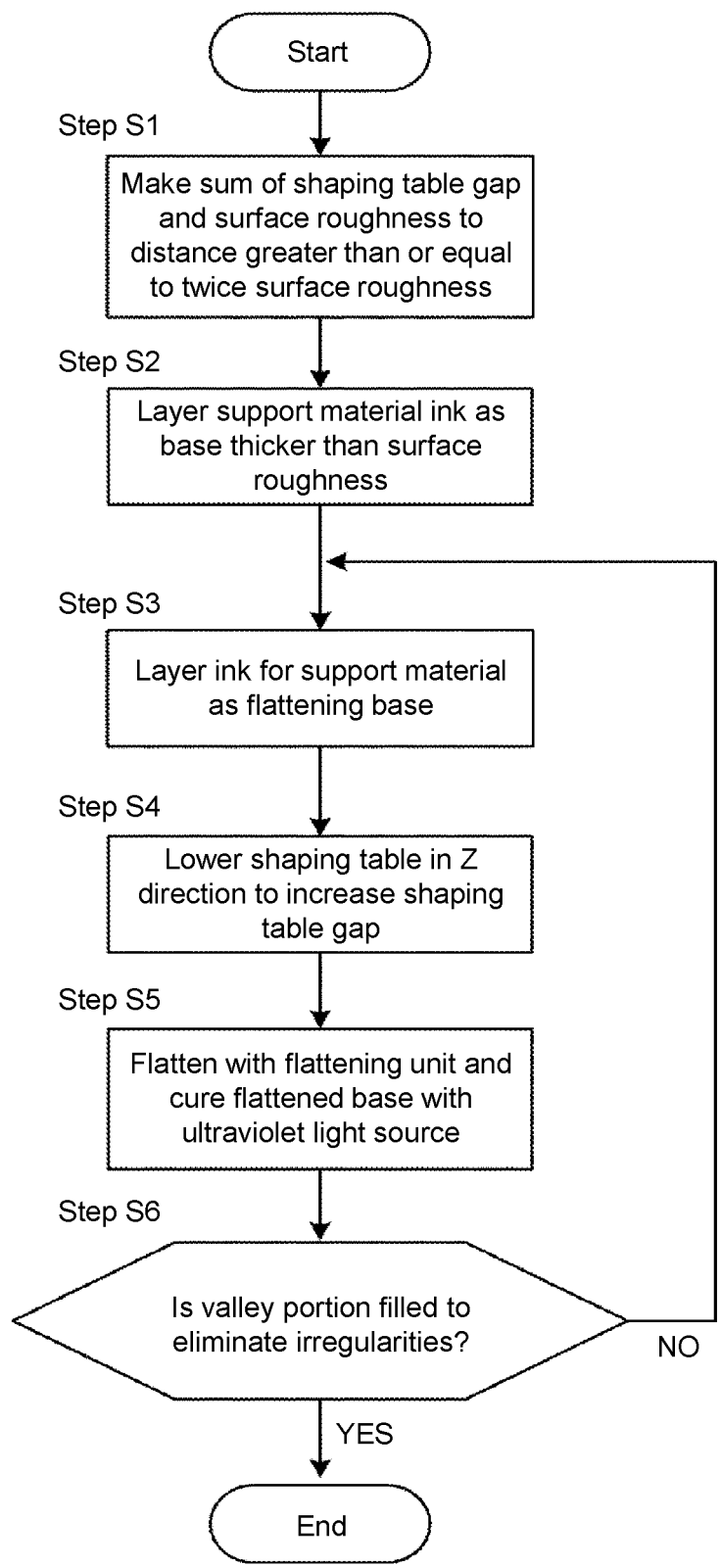
FIG. 5 is a flowchart describing an operation of flattening a surface of the foundation on which the three-dimensional shaped object is shaped using the support material ink.

Next, the entire operation of flattening the surface of the base on which the three-dimensional shaped object is shaped using the support material ink will be described using the flowchart shown in FIG. 5.

First, the sum of the shaping table gap G and the surface roughness is set to a distance greater than or equal to twice the surface roughness (step S1). At this time, the distance may be controlled by the control unit using various distance meters or the like. Next, the support material ink is layered thicker than the surface roughness (step S2). For example, when the surface roughness, more specifically, the ten point average roughness is 200 microns, the support material ink is layered as the base 40 for, for example, 220 microns. Thereafter, although not shown, the support material ink is cured by the ultraviolet light source 9. Then, the support material ink is further layered as the flattening base 57 (step S3). At this time, the thickness to be layered is defined as T. In the next step, the shaping table 3 (see FIG. 1A) is lowered in the Z direction to increase the shaping table gap G (Step S4). Defining the distance by which the shaping table gap G is increased as M, T>M is desired for flattening, which is the next step. Then, the layered flattening base is flattened by the flattening unit 5 (see FIG. 1A), and then irradiated with the ultraviolet light by the ultraviolet light source 9 to cure the flattening base (step S5). When the valley portion 30 (see e.g., FIG. 3C) is filled and irregularities reflecting the surface roughness of the shaping table 3 are eliminated, the flattening operation is terminated (YES side of step S6). When the valley portion 30 (see, e.g., FIG. 3C) still remains and the irregularities reflecting the surface roughness of the shaping table 3 have not been eliminated, the process returns to step S3 and the flattening base is further layered (NO side of step S6).

According to the three-dimensional shaping method of the embodiment of the present disclosure, an excellent effect is obtained in that the surface roughness, specifically, the irregularities and undulation of the upper surface of the shaping table can be compensated using the support material ink on the shaping table with a minimum number of layering.

According to the present disclosure, while the layering scanning driving unit is changing the shaping table gap, which is the distance between the shaping table and the flattening unit, the control unit that carries out the control of the entire three-dimensional shaping device controls the ejection unit to form on the shaping table the support layer, which supports the three-dimensional shaped object being shaped from the lower part side in the vertical direction, and the three-dimensional shaped object in such order on the shaping table.

According to the three-dimensional shaping method of the embodiment of the present disclosure, with respect to the surface roughness, specifically, the irregularities and undulation of the upper surface 23 of the shaping table 3, the foundation 60 having a flat surface can be formed by layering and flattening the support layer of sufficient thickness on the shaping table 3 using the support material ink, so that an excellent effect is obtained in that the quality of the three-dimensional shaped object to be shaped on the foundation 60 is improved.

Furthermore, when forming the lower part side 40 of the support layer, the layering time for eliminating the surface roughness of the shaping table 3 can be shortened since the shaping table 3 is not moved in the layering scanning direction. Moreover, when forming the upper part side 57 of the support layer, an excellent effect is obtained in that the interference of the flattening unit 5, the ink layered and cured as the lower part side 40, and the ejection unit can be prevented by lowering the shaping table 3.

According to the three-dimensional shaping method of the embodiment of the present disclosure, since the ejection unit and the shaping table 3 can be relatively separated in the layering scanning direction every time one layer of the upper part side 57 of the support layer is layered, an effect is obtained in that the interference between the cured ink and the ejecting unit can be prevented.

According to the three-dimensional shaping method of the embodiment of the present disclosure, since the layering scanning distance, which is the distance change in the layering scanning direction, is smaller than the thickness of layering the upper part side 57 of the support layer, an excellent effect is obtained in that a flatness on the upper part side 57 of the support layer is ensured.

According to the three-dimensional shaping method of the embodiment of the present disclosure, when forming the lower part side 40 of a plurality of layers, the shaping table gap G, which is the distance between the shaping table 3 and the flattening unit 5, is not changed, and thus an effect is obtained in that the time for scanning the shaping table 3 in the layering scanning direction can be reduced and the time for shaping can be reduced. Furthermore, with respect to the upper part side 57 of the plurality of layers, a support layer having a flat surface can be formed since the surface can be flattened. Therefore, the quality of the three-dimensional shaped object to be shaped on the support layer is improved.

According to the three-dimensional shaping method of the embodiment of the present disclosure, the sum of the shaping table gap G, which is the distance between the shaping table 3 and the flattening unit 5, and the surface roughness of the upper surface 23 of the shaping table 3 is made to a distance greater than or equal to twice the surface roughness in advance, and hence an excellent effect is obtained in that the support layer formed using the support material ink can be layered with a sufficient thickness.

According to the three-dimensional shaping method of the embodiment of the present disclosure, when compensating the surface roughness, specifically, irregularities and undulation of the upper surface 23 of the shaping table 3 using the support material ink on the shaping table 3, the lower part side 40 of the support layer is layered thicker than the upper part side 57 so that a number of layering for the foundation can be reduced and consequently the layering time can be shortened.

According to the three-dimensional shaping method of the embodiment of the present disclosure, since the thickness layered on the lower part side 40 of the plurality of layers is larger than the surface roughness on the upper surface of the shaping table, the quality of the three-dimensional shaped object shaped on the support layer is improved and the upper surface 23 of the shaping table 3 is reliably covered with the support layer, so that an excellent effect is obtained in that the three-dimensional shaped object shaped thereon can be easily detached from the shaping table.

According to the three-dimensional shaping method of the embodiment of the present disclosure, the surface roughness, specifically, irregularities and undulation of the upper surface 23 of the shaping table 3 is compensated by forming the flat foundation 60 using the support material ink on the shaping table 3 and then the three-dimensional shaped object is formed, so that the quality of the three-dimensional shaped object is improved.

The present disclosure and effects thereof are summarized as follows in another format.

The present disclosure provides a three-dimensional shaping device including a shaping table having a substantially flat upper surface on which the three-dimensional shaped object is shaped; an ejection unit that ejects ink for three-dimensional shaping; a main scanning direction driving unit that causes the ejection unit to carry out a main scanning operation of ejecting the ink while relatively moving with respect to the three-dimensional shaped object being shaped in a main scanning direction set in advance; a layering scanning driving unit that causes a layering scanning operation of relatively moving the shaping table with respect to the ejection unit to be carried out in a layering scanning direction, which is a direction in which the ink is layered; a flattening unit that flattens the ejected and layered ink; and a control unit that controls the shaping of the three-dimensional shaped object; where the control unit causes the ejection unit to shape a base, which is a structural object, formed using a support material ink to become a material of a support layer supporting the three-dimensional shaped object being shaped and the three-dimensional shaped object in such order on the shaping table while carrying out distance control of controlling a shaping table gap, which is a distance between the shaping table and the flattening unit; the control unit causes the layering scanning driving unit to carry out a drive of the layering scanning operation to increase the shaping table gap each time the ejection unit is caused to carry out a predetermined number of main scanning operations to a same position on the three-dimensional shaped object being shaped as the distance control during the shaping of the three-dimensional shaped object; and the control unit carries out a first distance control of causing the ejection unit to carry out the main scanning operation of a number of times greater than the predetermined number of times to a same position on the base being formed without changing the shaping table gap and a second distance control of increasing the shaping table gap each time the ejection unit is caused to carry out the predetermined number of main scanning operations to the same position on the base being formed as the distance control during the formation of the base.

With respect to the surface roughness, specifically, irregularities and undulation of the upper surface of the shaping table, a base of sufficient thickness is layered and flattened on the shaping table using the support material ink so that a base having a flat surface can be formed, whereby an excellent effect is obtained in that the quality of the three-dimensional shaped object shaped on the base is improved.

The present disclosure provides the three-dimensional shaping device, where the flattening unit is not brought into contact with the support layer being shaped during the first distance control, and the flattening unit is brought into contact with the support layer during the main scanning operation of at least a few times during the second distance control.

The base is formed using the support material ink without changing the shaping table gap, which is the distance between the shaping table and the flattening unit, during the first distance control, and thus a time for scanning the shaping table in the layering scanning direction can be reduced, and a time for shaping can be reduced. Furthermore, during the second distance control, the surface of the base can be flattened, so that a base having a flat surface can be formed. Therefore, an excellent effect is obtained in that the quality of the three-dimensional shaped object shaped on the base is improved.

The present disclosure provides the three-dimensional shaping device, where during the second distance control, the control unit causes the layering scanning driving unit to carry out the layering scanning operation of a predetermined distance every time the predetermined number of main scanning operations are performed on each position in the base.

As the layering scanning operation is carried out every time the predetermined number of main scanning operations, specifically, every time the operation of ejecting ink or the like from the ejection unit is carried out by a predetermined number of times, for example, by the number of pass while changing a relative positional relationship between the ejection unit and the shaping table for the base, a fine layering and flattening can be performed on the base, and a base having an extremely flat surface can be formed with a necessary and sufficient amount of ink.

The present disclosure provides the three-dimensional shaping device, where the thickness of the base ejected from the ejection unit and layered during the first distance control is larger than the surface roughness of the upper surface of the shaping table.

Since the thickness of the base layered during the first distance control is larger than the surface roughness of the upper surface of the shaping table, the upper surface of the shaping table is reliably covered with the base, and hence the three-dimensional shaped object shaped thereon can be easily detached from the shaping table.

The present disclosure provides the three-dimensional shaping device, where the surface roughness of the upper surface is an arithmetic mean roughness or a ten point average roughness.

Since the thickness of the base layered during the first distance control is larger than the arithmetic average roughness or the ten point average roughness which is the surface roughness on the upper surface of the shaping table, the upper surface of the shaping table is reliably covered with the base, whereby the three-dimensional shaped object shaped thereon can be easily detached from the shaping table.

The present disclosure provides the three-dimensional shaping device, where before the ejection unit ejects the support material ink to form the base, the control unit sets a sum of the shaping table gap and the surface roughness of the upper surface of the shaping table to be greater than or equal to twice the surface roughness.

The sum of the shaping table gap, which is the distance between the shaping table and the flattening unit, and the surface roughness on the upper surface of the shaping table, is made to be a distance greater than or equal to twice the surface roughness in advance, so that the base formed by using the support material ink can be layered with a sufficient thickness.

The present disclosure provides the three-dimensional shaping device, where the control unit controls the operation of forming the base on the basis of a designation of a base forming mode indicating a manner of forming the base, and also accepts from a user an instruction to select one of a plurality of base forming modes different from each other; and at least a mode of forming the base by carrying out the first distance control and the second distance control, and a mode of forming the base without carrying out the first distance control can be selected as the plurality of base forming modes.

Since the mode of forming the base by carrying out the first distance control and the second distance control, and the mode of forming the base without carrying out the first distance control can be selected, the user can appropriately form an optimum base.

The present disclosure provides a three-dimensional shaping method for shaping a three-dimensional shaped object by ejecting ink, where with respect to a three-dimensional shaping device including a shaping table having a substantially flat upper surface on which the three-dimensional shaped object is shaped; an ejection unit that ejects ink for three-dimensional shaping; a main scanning direction driving unit that causes the ejection unit to carry out a main scanning operation of ejecting the ink while relatively moving with respect to the three-dimensional shaped object being shaped in a main scanning direction set in advance; a layering scanning driving unit that causes a layering scanning operation of relatively moving the shaping table with respect to the ejection unit to be carried out in a layering scanning direction, which is a direction in which the ink is layered; a flattening unit that flattens the ejected and layered ink; and a control unit that controls the shaping of the three-dimensional shaped object; the control unit causes the ejection unit to shape a base, which is a structural object, formed using a support material ink to become a material of a support layer supporting the three-dimensional shaped object being shaped and the three-dimensional shaped object in such order on the shaping table while carrying out distance control of controlling a shaping table gap, which is a distance between the shaping table and the flattening unit; the control unit causes the layering scanning driving unit to carry out a drive of the layering scanning operation to increase the shaping table gap each time the ejection unit is caused to carry out a predetermined number of main scanning operations to a same position on the three-dimensional shaped object being shaped as the distance control during the shaping of the three-dimensional shaped object; and the control unit includes a first distance control step of causing the ejection unit to carry out the main scanning operation of a number of times greater than the predetermined number of times to a same position on the base being formed without changing the shaping table gap and a second distance control step of increasing the shaping table gap each time the ejection unit is caused to carry out the predetermined number of main scanning operations to the same position on the base being formed as the distance control during the formation of the base.

With respect to the surface roughness, specifically, irregularities and undulation of the upper surface of the shaping table, a base having a sufficient thickness is layered on the shaping table using a support material ink and then flattened so that a base having a flat surface can be formed, and hence an excellent effect is obtained in that a quality of the three-dimensional shaped object shaped on the base is improved.

The present disclosure provides a three-dimensional shaping device that performs three-dimensional shaping by compensating for a surface roughness of a substantially flat upper surface of a shaping table on which a three-dimensional shaped object is shaped, where without a control unit that controls a distance between the upper surface of the shaping table and a flattening unit, which flattens the ejected and layered ink, changing the distance, an ejection unit that ejects the ink layers a support material ink to become the material of a support layer supporting the three-dimensional shaped object being shaped so as to be thicker than the surface roughness; the control unit carries out a distance control of increasing the distance every time the ejection unit is caused to carry out a predetermined number of main scanning operations of ejecting the ink while relatively moving with respect to the three-dimensional shaped object being shaped in a main scanning direction set in advance, and when the control unit compares a layering scanning distance, which is a distance change in the layering scanning direction in the layering scanning operation carried out by the layering scanning driving unit and a base layered thickness, which is a thickness of the support material ink ejected and layered from the ejection unit when the ejection unit carries out a predetermined number of main scanning operations on each position in the base, the layering scanning distance is smaller than the base layered thickness.

With respect to the surface roughness, specifically, irregularities and undulation of the upper surface of the shaping table, a base having a sufficient thickness is layered on the shaping table using a support material ink and then flattened so that a base having a flat surface can be formed, and hence an excellent effect is obtained in that the quality of the three-dimensional shaped object shaped on the base is improved.

The present disclosure provides a three-dimensional shaping method for performing three-dimensional shaping by compensating for a surface roughness of a substantially flat upper surface of a shaping table on which a three-dimensional shaped object is shaped, the method including a step in which an ejection unit that ejects the ink layers a support material ink which is a material of a support layer supporting the three-dimensional shaped object being shaped so as to be thicker than the surface roughness without a control unit that controls a distance between the upper surface of the shaping table and a flattening unit that flattens an ejected and layered ink changing the distance; and a step in which the control unit increases the distance every time the ejection unit is caused to carry out a predetermined number of main scanning operations of ejecting the ink while relatively moving with respect to the three-dimensional shaped object being shaped in a main scanning direction set in advance; where when the control unit compares a layering scanning distance, which is a distance change in the layering scanning direction in the layering scanning operation carried out by the layering scanning driving unit and a base layered thickness, which is the thickness of the support material ink ejected and layered from the ejection unit when the ejection unit carries out a predetermined number of main scanning operations on each position in the base, the layering scanning distance is smaller than the base layered thickness.

With respect to the surface roughness, specifically, irregularities and undulation of the upper surface of the shaping table, a base having a sufficient thickness is layered on the shaping table using a support material ink and then flattened so that a base having a flat surface can be formed, and hence an excellent effect is obtained in that the quality of the three-dimensional shaped object shaped on the base is improved.

What is claimed is:

1. A three-dimensional shaping method for shaping a three-dimensional shaped object using a three-dimensional shaping device comprising: a shaping table having an upper surface with a surface roughness on which the three-dimensional shaped object is shaped; an ejection unit; a planar scanning driving unit; and a flattening unit, wherein three-dimensional shaping method comprises:
   utilizing the ejection unit to eject ink for three-dimensional shaping;
   utilizing the planar scanning driving unit to relatively move the ejection unit with respect to the shaping table in a plane parallel to the upper surface of the shaping table;
   utilizing the layering scanning driving unit to relatively separate the ejection unit and the shaping table from each other in a layering scanning direction which is a direction perpendicularly intersecting the planar direction and in which the ink is layered;
   utilizing the flattening unit to flatten the ejected and layered ink; and
   layering a plurality of layers on the shaping table before shaping the three-dimensional shaped object to form a support layer disposed between the shaping table and the three-dimensional shaped object to support the three-dimensional shaped object from a lower side and compensate the surface roughness to obtain the upper surface in a flat shape; wherein
   the plurality of layers have a lower part side in a vertical direction of the plurality of layers formed only by the planar scanning driving unit, and an upper part side in the vertical direction of the plurality of layers formed using both the planar scanning driving unit and the layering scanning driving unit.

2. The three-dimensional shaping method according to claim 1, wherein
   the layering scanning driving unit relatively separates the ejection unit and the shaping table from each other in the layering scanning direction each time one layer of the upper part side in the vertical direction of the plurality of layers is layered.

3. The three-dimensional shaping method according to claim 1, wherein
a shaping table gap is increased every time the ejection unit is caused to carry out a predetermined number of planar scanning operations of ejecting the ink while relatively moving in the planar direction set in advance for a formation of the upper part side; and
when a layering scanning distance which is a distance change in the layering scanning direction in the layering scanning operation of the layering driving unit, and
a thickness on the upper part side ejected and layered from the ejection unit when the ejection unit carries out the predetermined number of planar scanning operations with respect to each position in the support layer are compared, the layering scanning distance is smaller than the thickness on the upper part side.

4. The three-dimensional shaping method according to claim 1, wherein
the flattening unit is not brought into contact with the support layer being formed while layering the lower part side, and
the flattening unit is brought into contact with the support layer during at least one planar scanning operation in the planar direction while controlling the upper part side.

5. The three-dimensional shaping method according to claim 1, wherein
before the ejection unit ejects a support material ink to form the support layer,
a sum of a shaping table gap, which is a distance between the shaping table and the flattening unit, and the surface roughness of the upper surface of the shaping table is made to greater than or equal to twice the surface roughness.

6. The three-dimensional shaping method according to claim 1, wherein
the lower part side of the plurality of layers is thicker than the upper part side.

7. The three-dimensional shaping method according to claim 1, wherein
a distance between the upper surface of the support layer and a bottom portion of a valley with a deepest surface roughness is greater than a maximum height which is a sum of a height of a mountain with a highest surface roughness of the shaping table and a depth of a valley with the deepest surface roughness.

8. The three-dimensional shaping method according to claim 1, wherein
while the layering scanning driving unit changes the shaping table gap, the control unit that controls the entire three-dimensional shaping device controls the ejection unit to form the support layer supporting the three-dimensional shaped object being shaped from the lower part side in the vertical direction and the three-dimensional shaped object in such order on the shaping table.

* * * * *